(12) United States Patent
Kurtz et al.

(10) Patent No.: US 7,188,528 B2
(45) Date of Patent: Mar. 13, 2007

(54) LOW PASS FILTER SEMICONDUCTOR STRUCTURES FOR USE IN TRANSDUCERS FOR MEASURING LOW DYNAMIC PRESSURES IN THE PRESENCE OF HIGH STATIC PRESSURES

(75) Inventors: Anthony D. Kurtz, Saddle River, NJ (US); Tonghuo Shang, East Lyme, CT (US); Boaz Kochman, New York, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/100,652

(22) Filed: Apr. 7, 2005

(65) Prior Publication Data

US 2005/0235754 A1    Oct. 27, 2005

Related U.S. Application Data

(63) Continuation-in-part of application No. 10/830,796, filed on Apr. 23, 2004.

(51) Int. Cl.
    *G01L 7/00*    (2006.01)
(52) U.S. Cl. ......................................................... 73/715
(58) Field of Classification Search .................... 73/715
    See application file for complete search history.

(56) References Cited

U.S. PATENT DOCUMENTS

| | | | | |
|---|---|---|---|---|
| 2,857,742 A * | 10/1958 | Drake ...................... | 60/39.281 |
| 3,188,607 A * | 6/1965 | Woodworth ................. | 367/154 |
| 3,455,157 A * | 7/1969 | Lahaye et al. ........... | 73/152.55 |
| 3,898,796 A * | 8/1975 | Canale et al. ............ | 60/39.281 |
| 4,040,172 A | 8/1977 | Kurtz et al. | |
| 4,063,209 A | 12/1977 | Kurtz et al. | |
| 4,590,933 A * | 5/1986 | Itoh ....................... | 128/205.24 |
| 4,926,697 A * | 5/1990 | Hardin .................... | 73/861.48 |
| 4,996,886 A * | 3/1991 | Hardin .................... | 73/861.48 |
| 5,004,215 A * | 4/1991 | Aubry et al. ........... | 267/140.13 |
| 5,855,771 A | 1/1999 | Fuerstenau et al. | |
| 5,955,771 A | 9/1999 | Kurtz et al. | |
| 6,543,293 B1 * | 4/2003 | Kurtz et al. .................. | 73/727 |
| 6,588,281 B2 | 7/2003 | Kurtz et al. | |

(Continued)

*Primary Examiner*—Max Noori
(74) *Attorney, Agent, or Firm*—Plevy, Howard & Darcy, PC

(57) ABSTRACT

A semiconductor filter is provided to operate in conjunction with a differential pressure transducer. The filter receives a high and very low frequency static pressure attendant with a high frequency low dynamic pressure at one end, the filter operates to filter said high frequency dynamic pressure to provide only the static pressure at the other filter end. A differential transducer receives both dynamic and static pressure at one input port and receives said filtered static pressure at the other port where said transducer provides an output solely indicative of dynamic pressure. The filter in one embodiment has a series of etched channels directed from an input end to an output end. The channels are etched pores of extremely small diameter and operate to attenuate or filter the dynamic pressure. In another embodiment, a spiral tubular groove is found between a silicon wafer and a glass cover wafer, an input port of the groove receives both the static and dynamic pressure with an output port of the groove providing only static pressure. The groove filters attenuate dynamic pressure to enable the differential transducer to provide an output only indicative of dynamic pressure by cancellation of the static pressure.

21 Claims, 3 Drawing Sheets

U.S. PATENT DOCUMENTS 6,595,066 B1  7/2003  Kurtz et al.
6,642,594 B2  11/2003  Kurtz
6,688,182 B2 *  2/2004  Kurtz et al. .................. 73/727
2003/0140704 A1 *  7/2003  Kurtz et al. .................. 73/727

* cited by examiner

LOW PASS FILTER SEMICONDUCTOR STRUCTURES FOR USE IN TRANSDUCERS FOR MEASURING LOW DYNAMIC PRESSURES IN THE PRESENCE OF HIGH STATIC PRESSURES

RELATED APPLICATION

This application is a continuation-in-part of co-pending U.S. patent application Ser. No. 10/830,796, entitled Pressure Transducer for Measuring Low Dynamic Pressures in the Presence of High Static Pressures, filed Apr. 23, 2004, the entire disclosure of which is hereby incorporated by reference as being set forth in its entirety herein.

FIELD OF THE INVENTION

The invention relates to pressure transducers for measuring low dynamic pressures in the presence of high static pressures, and more particularly to improved low pass filter structures employed with such transducers.

BACKGROUND

During the testing of jet engines and in many other environments, it is often desirable to measure both the static pressure and the dynamic pressure. The static pressure, in most instances, is usually very high and the dynamic pressure is much lower. The dynamic pressure is also associated with a distinct frequency which occurs at a relatively high rate, for example 5000 cycles/second or greater. In this manner, the dynamic pressure may typically be 20 times less than the static pressure. Hence, to measure static pressure, one requires a transducer with a relatively thick diaphragm so that it can stand the high static pressure. On other hand, such thick diaphragms have a poor response to low pressure. Therefore, to measure static pressure and dynamic pressure is extremely difficult unless one uses a thick diaphragm in conjunction with a thin diaphragm. However, if one uses a thin diaphragm, then this diaphragm will rupture upon application of the high static pressure which also contains the dynamic pressure. One can think of the dynamic pressure as a relatively high frequency fluctuation on top of a relatively high constant static pressure. Thus, as one can ascertain, using a thick diaphragm to measure dynamic and static pressure is not a viable solution.

U.S. Pat. No. 6,642,594 ('594 patent) entitled, "Single Chip Multiple Range Pressure Transducer Device", which issued on Nov. 4, 2003 to A. D. Kurtz, the inventor herein and is assigned to Kulite Semiconductor Products, Inc., the assignee herein, discloses problems with transducers responsive to large pressures utilized to measure low pressures. Thus, pressure transducer adapted to measure relatively large pressures typically suffer relatively poor resolution or sensitivity when measuring relatively low pressures. This is because, as a span of the sensor increases, the resolution or sensitivity of that sensor at the low end of the span decreases. An example of various piezoresistive sensors are indicated in the aforementioned '594 patent wherein different transducers have thinned regions having the same thickness, but different planar dimensions. In this manner, the thinned regions will deflect a different amount upon application of a common pressure thereto, whereby when excited each of the circuits provides an output indicative of the common pressure of a different operating range.

As indicated above, during the testing of jet engines there is a very high static pressure which, for example, may be 100 psi. Present with the static pressure is a low dynamic pressure, which may exhibit frequencies in the range of 5000 Hz and above. As indicated, using a high pressure sensor to measure the static pressure will yield an extremely poor response to the dynamic pressure because of the small magnitude of dynamic pressure which can be, for example, about 5 psi. Therefore, it is desirable to use a relatively rugged pressure transducer having a thick diaphragm to measure static pressure and to utilize another transducer on the same chip having a thinned diaphragm to measure dynamic pressure. Because the thinned transducer is exposed to static pressure both on the top and bottom sides, the static pressure cancels out and does not, in any manner, cause the thinned diaphragm to deflect. As described herein, both static and a dynamic pressure may be applied to the rear side of the diaphragm by a reference tube of substantial length. This reference tube, as will be explained, is a helical structure and has a low resonant frequency. In this manner, when a small dynamic pressure is applied because of the low internal frequency of the tube, the sensor will respond to the static pressure only. The thinned diaphragm should be stopped for pressures in excess of 25 psi, or some higher number than the desired dynamic pressure. The long reference tube can be made by taking a tubular structure and wrapping it such that it looks like a coil or spring. One end would be inserted into the transducer and other other end would be exposed to pressure. In this manner, one can implement a transducer for simultaneously measuring a low dynamic pressure in the presence of a high static pressure. Alternative transducer structures and methods for measuring low dynamic pressure in the presence of high static pressure are also desired.

SUMMARY

A semiconductor filter is provided to operate in conjunction with a differential pressure transducer. The filter receives both a high and relatively low frequency static pressure attendant with a high frequency low dynamic pressure at one end, and operates to filter the high frequency dynamic pressure to provide only the static pressure at the other filter end. A differential transducer receives both dynamic and static pressure at one input port and receives the filtered static pressure at the other port where the transducer provides an output solely indicative of dynamic pressure. The filter in one embodiment has a series of etched channels directed from an input end to an output end. The channels are etched pores of extremely small diameter and operate to attenuate or filter the dynamic pressure. In another embodiment, a spiral tubular groove is formed between a silicon wafer and a glass cover wafer. An input port of the groove receives both the static and dynamic pressure with an output port of the groove providing only static pressure. The groove filters attenuate dynamic pressure to enable the differential transducer to provide an output only indicative of dynamic pressure by cancellation of the static pressure.

DETAILED DESCRIPTION

Figure 1:
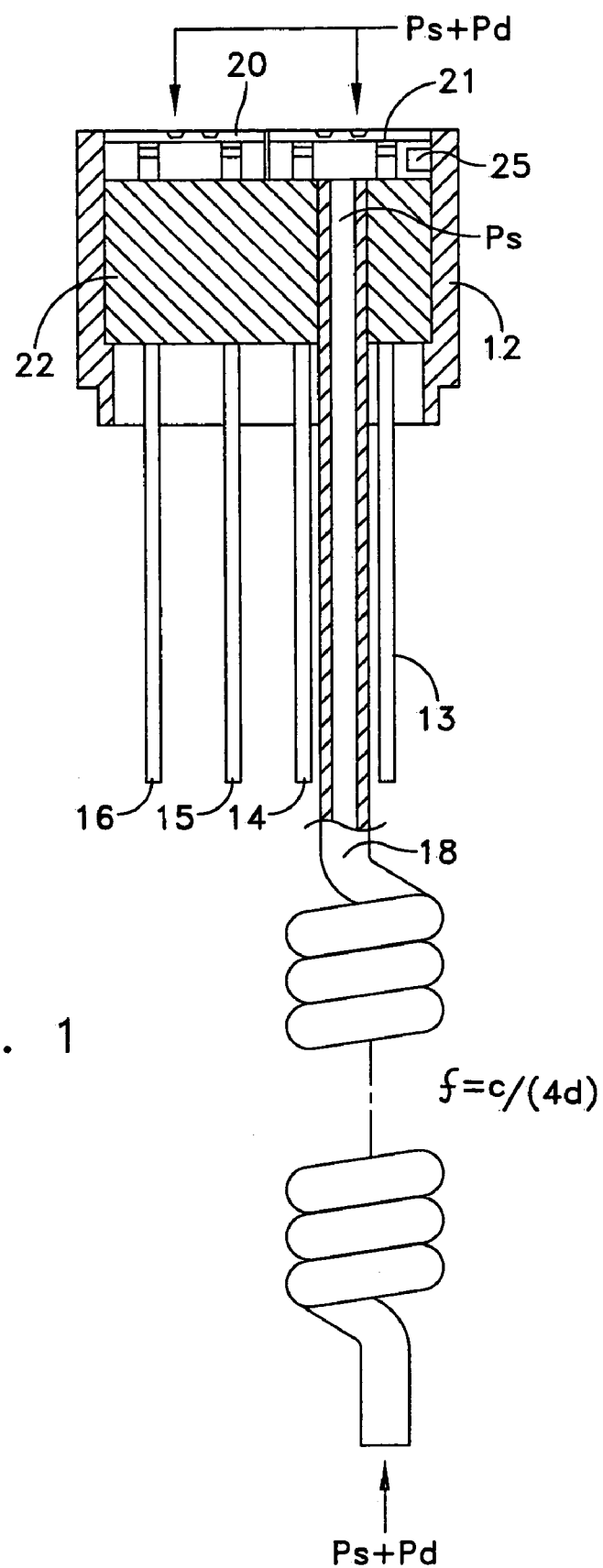
FIG. 1 is a partial cross sectional view of a pressure transducer for measuring low dynamic pressures in the presence of high static pressures.

Referring to FIG. 1, there is shown a pressure transducer which basically consists of two leadless peizoresistive sensors, or transducers, 20 and 21 mounted on header pins in accordance with the methods disclosed in Kulite U.S. Pat. No. 5,955,771 entitled, "Sensors for Use in High Vibrational Applications and Methods for Fabricating the Same" which issued on Sep. 21, 1999 to A.D. Kurtz et al, the inventor herein and assigned to Kulite Semiconductor Products, Inc., the assignee herein. This patent is incorporated herein by reference.

Shown in FIG. 1 are two separate transducers 20 and 21 which are fabricated by the same process as according to the teachings of the above-noted co-pending application and patent. The difference between the two transducer or sensor structures is that the sensor structure on the left (20) has a diaphragm which is thicker than the diaphragm of the sensor structure on the right (21). Both sensors receive on their top surfaces a pressure indicative of the static pressure ($P_s$) plus the dynamic pressure ($P_d$) ($P_s+P_d$). As indicated, the static pressure ($P_s$) may be of a relatively high value and, for example, could be 100 psi or more. The dynamic pressure ($P_d$) appears as a ripple on top of the static pressure ($P_s$) and is characterized by a relatively high frequency on the order of magnitude of 5000 Hz and above and a low value of 5 psi or less. Both sensors receive the combination of the static plus the dynamic pressure shown in FIG. 1. Sensor 20, as indicated, has a thicker diaphragm and responds mainly to the static pressure to produce at the output pins (15, 16) associated therewith, and disposed through header 22, a voltage proportional to the static pressure. This voltage would indicate a static pressure of 100 psi or greater, whatever the case may be.

While the output of transducer 20 is also responsive to the dynamic pressure ($P_d$), the dynamic pressure ($P_d$) is an extremely small percentage of the total static pressure ($P_s$) and may, as indicated, be on the order of 5 psi or less. The thin diaphragm associated with the transducer 21 will respond only to the dynamic pressure ($P_d$), as will be explained. As seen in the Figure, transducer 21 has the static plus the dynamic pressure applied to the top surface and is indicated again by Ps+Pd. Coupled to the bottom surface of the diaphragm is a tube or reference tube of an exceedingly long length, designated by reference numeral 18. The tube 18 is coupled to the bottom surface of the diaphragm. Essentially, the tube 18 receives at an inlet both the static and dynamic pressure, which is Ps+Pd.

The tube, as shown, is in helical form it is well known that the resonant frequency f of such a tube, as, for example, an organ pipe, is given by $f=c/(4l)$, where c is the speed of sound, and l is the length of the tube. For instance, in air, where the speed of sound is approximately 1200 feet per second, a tube length of 2½ feet will give a resonant frequency of 120 Hz. Thus, tube 18 acts as a low pass filter and will only pass frequencies which are below 120 Hz. In this manner, the dynamic frequency, which is 5000 Hz or greater, will not pass through the tube 18. Therefore, the underside of the diaphragm associated with transducer 21 only receives the status pressure ($P_s$). The static pressure ($P_s$) subtracted from the static pressure plus the dynamic pressure ($P_s+P_d$) supplied to the top surface of the diaphragm such that the output of the differential unit 21 provides a pressure equal to the differential pressure ($P_d$) via output pins 13 and 14. As seen, there is a stop member associated with diaphragm 21. The stop member 25 assures that the diaphragm 21 will not deflect in a downward direction for pressures in excess of 25 psi, or some number higher than the desired dynamic pressure. The reference tube is fabricated by taking a tubular structure, which may be metal or some other material, and wrapping it such that it looks like a coil or a spring where one end is inserted into the transducer, as shown, and the other end is exposed to the static and dynamic pressure. Reference is made to U.S. Pat. No. 6,642,594 entitled, "Single Chip Multiple Range Pressure Transducer Device" issued on Nov. 4, 2003 to A. D. Kurtz, the inventor herein and assigned to the assignee herein, the entire disclosure of which is hereby incorporated by reference herein as well.

Therefore, the diaphragm associated with sensor 20 is intended for accurately measuring static pressure. The sensor unit 21 will measure dynamic pressure because of the differential operation of the sensor 21 and because of the tube. These dynamic pressures have relatively high frequencies measured primarily by the first transducer structure or assembly 21, with the second transducer structure or assembly 20 measuring the steady state pressure, which is a large pressure. The fabrication of stops, such as 25 for transducers, is well known in the art. See, for example, U.S. Pat. No. 4,040,172 entitled, "Method of Manufacturing Integral Transducer Assemblies Employing Built-In Pressure Limiting" issued on Aug. 9, 1997 to A. D. Kurtz et al and is assigned to the assignee herein. See also U.S. Pat. No. 4,063,209 entitled, "Integral Transducer Assemblies Employing Built-In Pressure Limiting" issued on Dec. 13, 1997 to A. D. Kurtz et al. and assigned to the assignee herein. The entire disclosures of U.S. Pat. Nos. 4,040,172 and 4,063,209 are also incorporated by reference herein.

See also U.S. Pat. No. 6,595,066 issued on Jul. 22, 2003 to A. D. Kurtz et al. and is assigned to the assignee herein and entitled, "Stopped Leadless Differential Sensor". This patent describes a leadless device which is similar to the devices utilized in FIG. 1 which has a stop apparatus associated therewith. The sensor depicted in the '066 patent also operates as a differential sensor with a Wheatstone bridge sensor array. The output provides a difference between a pressure applied to the top side of the sensor with respect to the force applied to the bottom side of the sensor. This sensor acts as the sensor 21 associated and seen in FIG. 1. U.S. Pat. No. 6,595,066 is incorporated herein.

See also U.S. Pat. No. 6,588,281 issued on Jul. 8, 2003 entitled, "Double Stop Structure for a Pressure Transducer" issued to A. D. Kurtz et al. and assigned to the assignee herein. That patent shows a stop device in both first and second directions. As one can ascertain from FIG. 1, a stop 25 is only required in the down direction. This is so, as the large pressure Ps+Pd, as applied to the top surface, could rupture the thin diaphragm if the pressure applied to the bottom surface momentarily is interrupted. In this manner, the diaphragm of the sensor 21 will impinge upon the stop 25 to prevent the fracture of the diaphragm. The interruption of the pressure applied to the bottom surface of the diaphragm could occur during pressure build-up or when the pressure source is first turned on or off. U.S. Pat. No. 6,588,281 is also incorporated herein.

Figure 2:
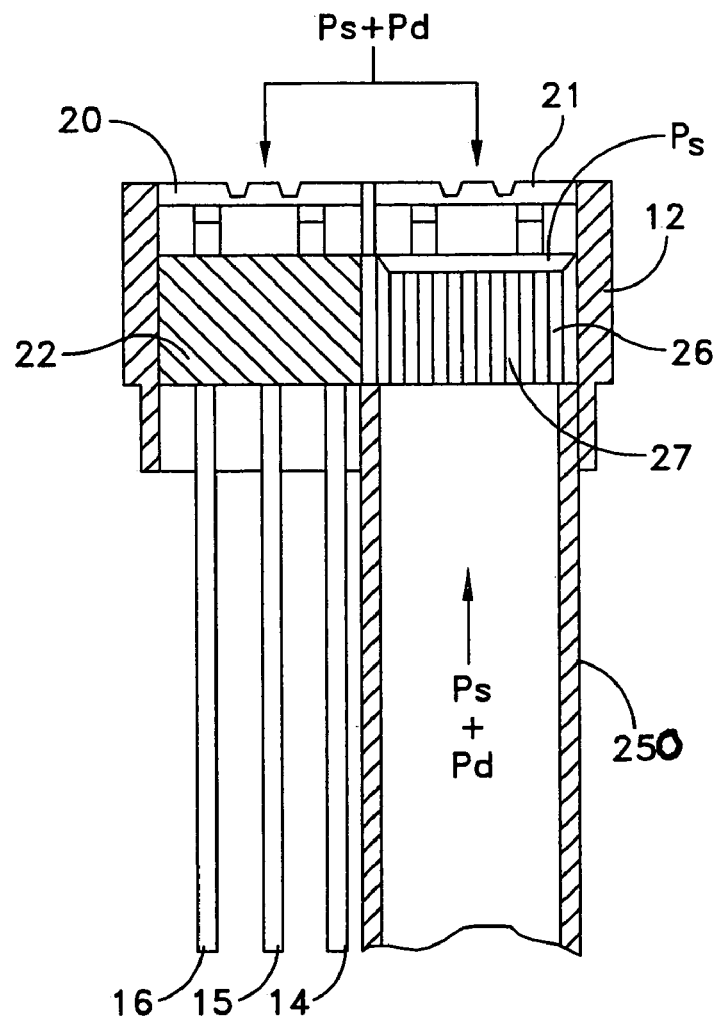
FIG. 2 is a partial cross sectional view of a pressure transducer for measuring low dynamic pressures in the presence of high static pressures employing a semiconductor attenuator according to an embodiment of the present invention.

Referring now to FIG. 2, there is shown a transducer structure in which the helical tube 18 of FIG. 1 is eliminated. As the tube or organ pipe illustrated in FIG. 1 may be expensive and/or difficult to fabricate and incorporate, the semiconductor structure of FIG. 2 operates to emulate the characteristics of the helical tube, including for example, frequency response, without providing such a helical tube.

FIG. 2 utilizes the same reference numerals as FIG. 1 for corresponding parts. It is seen that there are again two sensor diaphragms 20 and 21, each having piezoresistors located thereon and each receiving a pressure at a top surface which is the static plus dynamic pressure designated as $P_s+P_d$.

A reference tube 25 is shown which receives the pressure $P_s+P_d$ at the inlet. Disposed between the back surface of transducer 21 and the input of the reference tube 250 is a silicon wafer 26.

The wafer 26 has a plurality of holes or through channels 27, each having a diameter of less than about 0.001 inches and formed by etching or micromachining, for example. In this case, as indicated in FIG. 2, the small diameter holes or apertures serve to attenuate any high frequency components of the pressure caused by viscosity of the gas flowing through the apertures. The pressure and attenuation provided is determined by the diameter of the holes, the number of holes, as well as by the cavity volume on the underside of the sensing diaphragm.

The hole diameter, number of holes on the silicon wafer 26, and the cavity size are selected such that a desired filtering frequency can be obtained utilizing the formula:

$$\tau = \frac{32\gamma v V L}{AD^2 c^2}$$

where $\tau$=attenuation and
  $\gamma$ represents the ratio of specific heats; for air $\gamma$=1.4;
  $v$ represents the kinematic viscosity; for air v=14.5 m²/s or 0.0225 in²/s;
  V represents the volume of the cavity or wafer;
  L represents length of the pipe
  A represents the total area of feeding pipes or apertures;
  D represents the diameter of feeding pipe or apertures; and
  c represents the speed of sound, which is about 1120 ft/s at room temperatures.

For example; to achieve a cut-off frequency of 100 Hz, or a time constant of 10 milliseconds, the following parameters can be selected.
D=0.0002 inch
A=0.000625 inch² assuming 25% pososity and a 0.050" chip
c=1120 ft/s=13400 inch/2
L=0.005
V=0.001 in³

As one can see, attenuation is determined by the diameter of the hole as well as the number of holes. The wafer having the silicon holes acts as a single hole of considerably longer length. The fabrication of holes in silicon is well understood and can be accurately controlled. See for example, an article entitled "Porous Silicon/A New Material for MEMs" published in the IEEE 1996 by V. Lehmann of Siemens Ag Munchen, Germany, which describes a technique for the formation of pores or holes in silicon with high aspect ratios utilizing electrochemical etching of n-type silicon wafers in hydrofluoric acid.

The wafer as shown in FIG. 2 is an n-type silicon wafer. As the article indicates, porous silicon has been used for many years and may be formed on a silicon substrate during anodization in a hydrofluoric acid electrolyte. Pore formation is present for anodic densities below a critical current density. The pore geometry can be controlled, as can the pore cross section. The pore cross section can vary between a circle and a forearm star depending on the formation conditions. Subsequent to the electrochemical pore formation, the cross section of the pores can be made more circular by oxidation steps or can be made more square shaped by anisotropic chemical etching for example using aqueous HF.

Figure 3:
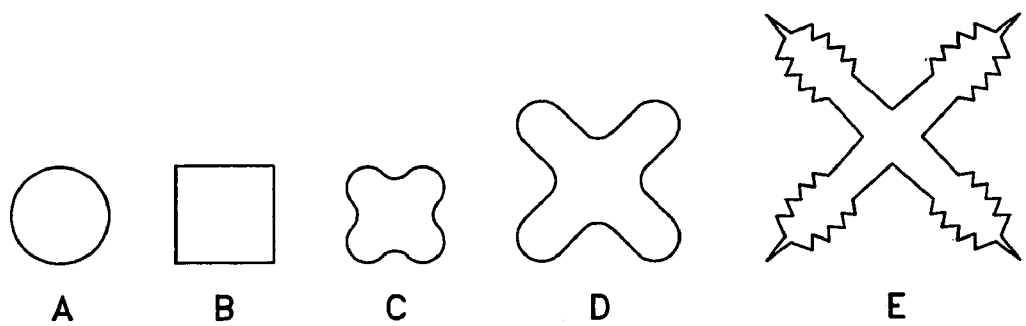
FIG. 3 is a series of top views showing alternate pore configurations useful for the semiconductor attenuator of FIG. 2.

Referring to FIG. 3, there is shown a series of pore cross sections, all of which shapes can be formed during the etching process, and which shapes have been described in the above-identified article. While circular shapes may be preferred, the pores can be of a square or any other suitable configuration represented by shapes designated A through E in FIG. 3.

While the above-identified article describes process steps which are standard techniques in microelectronic manufacturing, such techniques may be used to develop pore configurations in a silicon substrate which enable communication between the bottom surface of the substrate to the top surface of the substrate.

Based on the diameter of the pores and based on the width of the silicon wafer, one can therefore obtain the same frequency characteristics as are available by a helical tube. The bottom surface of wafer diaphragm 21 thus receives only the static pressure ($P_s$), whereby the higher frequency dynamic pressure is completely suppressed by the semiconductor wafer 26 having pores of configurations A–E as shown in FIG. 3.

The pore configurations A to E have various cross sections and will extend from the top surface of the wafer to the bottom surface of the wafer.

Figure 4:
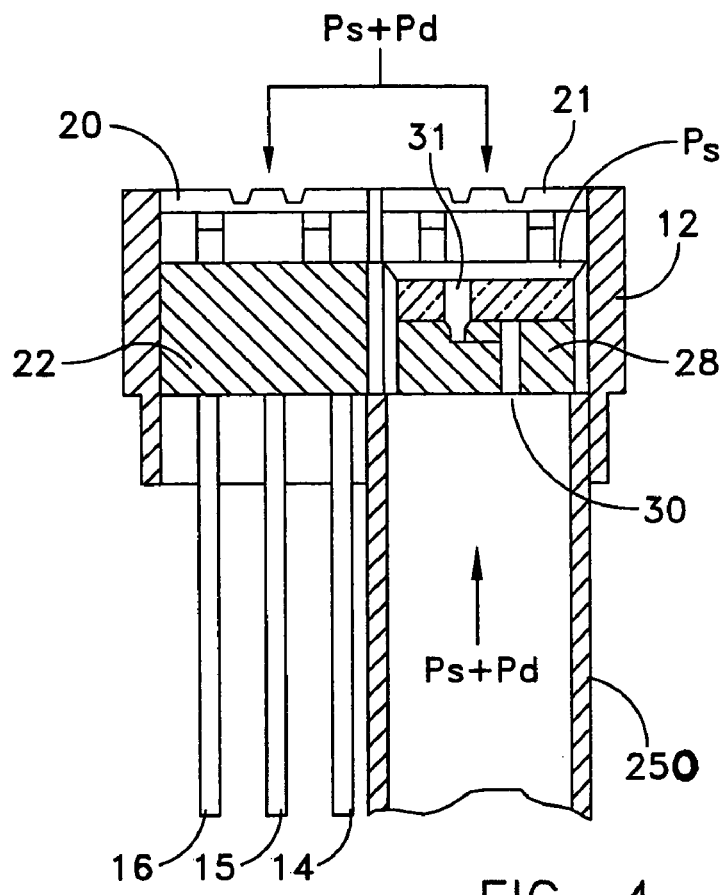
FIG. 4 is a partial cross sectional view of a pressure transducer responding to dynamic and static pressures employing a semiconductor helical structure operating as an attenuator.

Referring now to FIG. 4 there is shown an alternate embodiment of a semiconductor arrangement that emulates the helical tube illustrated in FIG. 1 and that functions in a manner similar to the apertured wafer structure 26 illustrated in FIG. 2. FIG. 4 illustrates transducer diaphragms 20 and 21 arranged in a housing 12 whereby the static plus dynamic pressure ($P_s+P_d$) is applied to the top surface. The reference tube 250 again receives the static and dynamic pressure, which now is applied to the bottom surface of a semiconductor wafer 28. The semiconductor wafer 28 has an input aperture 30 which is directed into a coiled hollow helical structure fabricated on the surface of the semiconductor substrate. The helical structure has an output aperture 31 communicating with the underside of the diaphragm 21.

Thus, the underside of the diaphragm 21 receives the static and dynamic pressure and because of the helical structure fabricated on the semiconductor wafer 28, the dynamic pressure frequencies are again suppressed.

Figure 5:
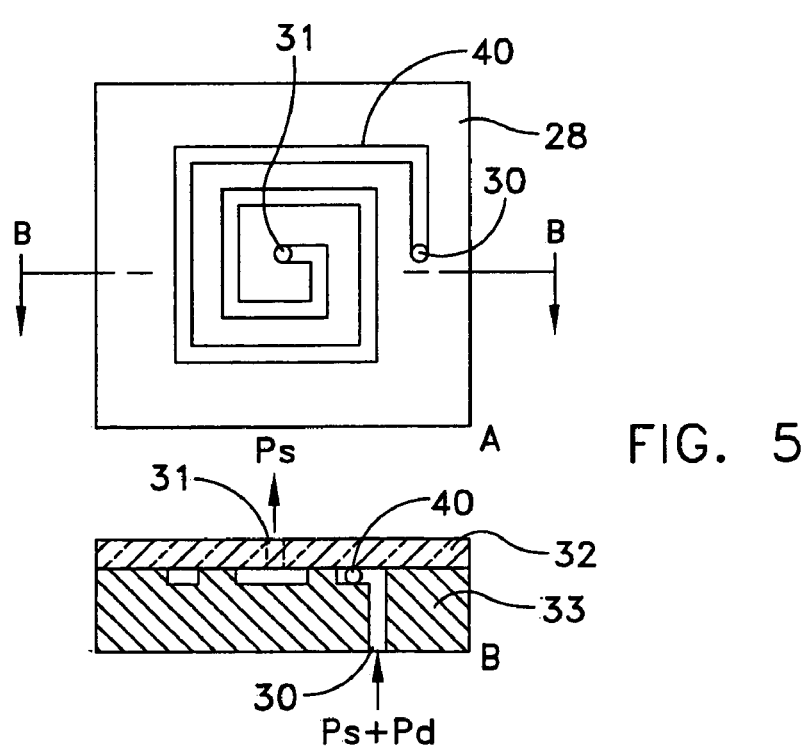
FIG. 5A shows a top view of the semiconductor attenuator utilized in FIG. 4.
FIG. 5B shows a cross sectional view of the semiconductor attenuator utilized in FIG. 4 taken through line B—B of FIG. 5A.

Referring to FIG. 5, there is shown a top view of the wafer 28. The wafer 28 as shown in a cross sectional view of FIG. 5b has a bottom silicon wafer 33 with a glass cover wafer 32. The silicon wafer is first processed to provide a helical structure 40 on a top surface. The helical structure 40 is fabricated at a given depth. The helical structure communicates with an aperture 30 as shown in FIG. 4 to enable the static plus the dynamic pressure to be applied to aperture 30.

The pressure is then circulated within the helical structure as covered by the glass cover member 32 and at the output aperture 31 the pressure $P_s$ which is the static pressure now applied to the underside of the diaphragm.

It is understood that there are numerous ways of fabricating helical structures in semiconductor material. These can be fabricated by utilizing stacking layers whereby a spiral coil is fabricated between these layers and effectively constitutes a helical semiconductor structure which manifests itself in having the same diameter and length as the helical tube shown in FIG. 1. In this case, the length of the spiral determines the frequency of operation according to the following formula $$f = \frac{c}{4L}\sqrt{1-\left(\frac{\frac{4v}{D^2}}{\frac{c}{4L}}\right)^2}$$

where c=speed of sound, about 1120 ft/s
L=length of pipe or spiral;
D=diameter of pipe or spiral;
v=kinematic viscosity: for air, v is about 14.5 m²/s or 0.0225 in²/s.

In an exemplary configuration, a spiral of 0.005 inch diameter and 1 inch in length achieves a filtering frequency f of 100 Hz.

By varying lengths and diameters of the holes, as for example concerning the embodiment depicted in FIG. 2, one can tailor the frequency attenuation to desired value. According to an aspect of the present invention, such frequency attenuation can be attained in an exceedingly small space. The structures as described herein can be mounted directly behind a deflecting diagram and beyond the header, as shown in FIG. 2 and FIG. 4, for example.

It should be noted that after using standard micromachining techniques, a significant number of these structures could be made simultaneously within a relatively small size (of silicon, for example). The processing techniques, as indicated above, will enable such structures to be produced, and hence produce reliable semiconductor attenuators or semiconductor filters for use in static and dynamic pressure measurements.

While it is understood that the figures and descriptions herein illustrate a dual transducer structure, it is understood that a single transducer can be utilized, whereby static and dynamic pressure applied to one surface and static and dynamic pressure are applied to the bottom surface or the opposing surface via a semiconductor attenuator such as a semiconductor wafer having through pores from the top to the bottom surface. Alternately, a semiconductor helical arrangement having a hollow passageway from an input port which receives the static and dynamic pressure to an output port which will only allow the static pressure to pass due to the length and diameter of the helix can be employed.

It is therefore understood that the above-noted semiconductor structures may replace the mechanical helical design in a more efficient and compact structure while enabling a great number of applications to be provided. While the above noted exemplary embodiments are preferred, it is also understood that alternative embodiments can be employed according to the teachings of this invention.

For example, a single transducer such as that depicted by reference numeral 21 can be utilized to produce an output indicative of dynamic pressure and whereby the static pressure would be cancelled. These and alternate embodiments can be ascertained by one skilled in the art and are deemed to be encompassed with the spirit and scope of the claims appended hereto.

What is claimed is:

1. A filter for use with a differential transducer for providing at an output a voltage proportional to a low dynamic pressure $P_d$ at a high frequency in the presence of a higher static pressure $P_s$ at a lower frequency, said transducer operative to receive said static and dynamic pressures $P_s$ and $P_d$ on a top surface and to receive only said static pressure $P_s$ at a bottom surface due to a filter operation for suppressing said dynamic pressure as applied to said bottom transducer surface, said differential transducer therefore providing an output indicative only of said dynamic pressure $P_d$ due to the cancellation of said static pressure $P_s$, said filter comprising:

a semiconductor wafer positioned proximate said bottom surface of said transducer and having high frequency attenuation means positioned thereon to enable said wafer to receive both said static and dynamic pressures at an input end and to provide only said static pressure at an output end proximate to said bottom transducer surface to cause said transducer to provide an output strictly proportional to said dynamic pressure.

2. The filter according to claim 1 wherein said semiconductor wafer has a series of etched apertures extending from an input end of said wafer to an output end of said wafer, said apertures being of a number and diameter to attenuate said dynamic pressure at said output to cause only said static pressure to appear at said output.

3. The filter according to claim 2, wherein said semiconductor wafer is silicon with said apertures being formed by a hydrofluoric acid etch.

4. The filter according to claim 3, wherein said silicon is n-type silicon.

5. The filter according to claim 2, wherein said apertures are circular in cross-section.

6. The filter according to claim 2 wherein said apertures are square in cross-section.

7. The filter according to claim 2, wherein said apertures are four armed stars in cross-section.

8. The filter according to claim 2, wherein the desired filtering frequency τ is obtained according to the following formula:

$$\tau = \frac{32\gamma v V L}{AD^2 c^2}$$

where
γ is the ratio of specific heats,
v is the kinematic viscosity,
V is the volume of the wafer,
A is the total area of apertures,
D is the diameter of the apertures,
L represents length of the tube,
c is the speed of sound.

9. The filter according to claim 1, wherein said semiconductor wafer has a spiral pattern formed on a top surface, said spiral formed to a given depth with said spiral being of a given length, with a first end of said spiral coupled to an input aperture extending from an input port of said spiral to a bottom input end of said wafer to enable said spiral to receive both said static and dynamic pressure; and wherein a cover member secured to said top surface of said wafer to cover said spiral to form a spiral tube, an output port aperture in said cover member for communicating with said other end of said spiral, with said cover member aperture proximate to said bottom transducer surface to provide at said output port said static pressure.

10. The filter according to claim 9 wherein said cover member is fabricated from glass.

11. The filter according to claim 9 wherein the length and diameter of said spiral tube is selected according to the following formula:

$$f = \frac{c}{4L}\sqrt{1-\left(\frac{\frac{4v}{D^2}}{\frac{c}{4L}}\right)^2}$$

Where
f is the filtered frequency,
d is the tube diameter,
c is the speed of sound,
v is the kinematic viscosity, and
L is the length of the tube.

12. A semiconductor filter for filtering high frequency low dynamic pressure fluctuations attendant with a relatively high constant static pressure at very low frequencies, comprising:
a semiconductor wafer having a top and a bottom surface and having a plurality of porous channels each of a given diameter and cross section directed from said bottom to said top surface, said pore diameter and the number of pores determinative of a filtered frequency, wherein when a high frequency low pressure signal attendant with a high pressure signal are applied to said bottom surface only said high pressure signal will propagate to said top surface.

13. The semiconductor filter according to claim 12 wherein said filter is used with a differential pressure transducer to enable said differential transducer to receive both said dynamic and static pressures at one port and to receive only filtered static pressure at said other port to cause said transducer to provide an output solely indicative of said dynamic pressure.

14. The filter according to claim 12, wherein said pore cross section is selected from circular, square or four armed star configuration.

15. The filter according to claim 12, wherein said semiconductor wafer is an n-type silicon wafer.

16. The filter according to claim 14, wherein said porous channels are etched into said n-type silicon wafer by hydrofluoric acid etching.

17. A semiconductor filter for filtering high frequency low dynamic pressure fluctuations attendant with a relatively high static pressure at very low frequencies, comprising,
a semiconductor wafer having a top and bottom surface, said top surface having a spiral groove of a given depth and length formed thereon, said bottom surface having an aperture forming an input port with said aperture communicating with one end of said groove at the top surface, a cover member secured to said top surface to cover said groove to form a tubular spiral and said cover member having an aperture communicating at one end with the other end of said spiral tube and to provide an output port opening at the top of said cover member, whereby when said static and dynamic pressure are applied to said input port said spiral groove attenuates said dynamic pressure to cause said static pressure to appear at said output port.

18. The semiconductor filter according to claim 17, wherein said cover member is glass.

19. The semiconductor filter according to claim 17 wherein said semiconductor wafer is silicon.

20. The semiconductor filter according to claim 17 wherein said filter is used with a differential pressure transducer to enable said differential transducer to receive both said static and dynamic pressures at one input port and to receive only said static pressure at said other input port due to the filtering of said dynamic pressure by said filter to cause said transducer, to provide an output solely indicative of said dynamic pressure.

21. The filter according to claim 19 wherein said groove is etched into the top surface of said silicon wafer.

* * * * *